United States Patent
Sokolov et al.

(10) Patent No.: US 8,226,242 B2
(45) Date of Patent: Jul. 24, 2012

(54) PROJECTION DISPLAY FOR DISPLAYING A COLOR IMAGE BY MODULATING A PLURALITY OF SINGLE BEAMS ACCORDING TO IMAGE INFORMATION

(75) Inventors: Kirill Sokolov, Suwon-si (KR); Dae-sik Kim, Suwon-si (KR); Young-chol Lee, Gunpo-si (KR); Alexei Borodouline, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1380 days.

(21) Appl. No.: 11/837,909

(22) Filed: Aug. 13, 2007

(65) Prior Publication Data

US 2008/0068514 A1    Mar. 20, 2008

(30) Foreign Application Priority Data

Sep. 19, 2006  (KR) .................. 10-2006-0090478

(51) Int. Cl.
  *G03B 21/26*   (2006.01)
  *G03B 21/28*   (2006.01)
(52) U.S. Cl. .................................... 353/37; 353/99
(58) Field of Classification Search .............. 348/744, 348/750, 751, 756, 759, 771; 359/196.1, 359/198.1, 205.1, 206.1, 202.1, 201.1, 201.2; 353/30, 31, 37, 46, 50, 51, 82, 94, 98, 99
See application file for complete search history.

(56) References Cited

U.S. PATENT DOCUMENTS

| | | | | |
|---|---|---|---|---|
| 5,622,417 A * | 4/1997 | Conner et al. | ........... | 353/69 |
| 6,945,652 B2 * | 9/2005 | Sakata et al. | ........... | 353/30 |
| 7,385,745 B2 * | 6/2008 | Ishihara | ........... | 359/202.1 |
| 2006/0082857 A1 | 4/2006 | Song et al. | | |
| 2007/0268458 A1 * | 11/2007 | Lee et al. | ........... | 353/31 |
| 2008/0309888 A1 * | 12/2008 | Giorgi | ........... | 353/81 |

FOREIGN PATENT DOCUMENTS

| | | |
|---|---|---|
| JP | 2006119638 A | 5/2006 |
| WO | 0133283 A1 | 5/2001 |

* cited by examiner

*Primary Examiner* — Pascal M Bui Pho
*(74) Attorney, Agent, or Firm* — Sughrue Mion, PLLC (57) ABSTRACT

Provided is a compact projection display with high throughput. The projection display includes: an illumination unit which irradiates a plurality of single color light beams; a first scanner scanning the plurality of light beams irradiated from the illumination unit along a first direction; a light modulator with a linear array of micro-electromechanical system (MEMS) devices that are arranged parallel to the first direction; an F-θ lens disposed between the first scanner and the light modulator and having a first entrance pupil and a second entrance pupil; and a second scanner disposed opposite to the second entrance pupil of the F-θ lens and which scans a light beam passing through the second entrance pupil of the F-θ lens on a screen along a second direction that is orthogonal to the first direction.

16 Claims, 8 Drawing Sheets

PROJECTION DISPLAY FOR DISPLAYING A COLOR IMAGE BY MODULATING A PLURALITY OF SINGLE BEAMS ACCORDING TO IMAGE INFORMATION

CROSS-REFERENCE TO RELATED PATENT APPLICATIONS

This application claims priority from Korean Patent Application No. 10-2006-0090478, filed on Sep. 19, 2006, in the Korean Intellectual Property Office, the disclosure of which is incorporated herein in its entirety by reference.

BACKGROUND OF THE INVENTION

1. Field of the Invention

Apparatuses consistent with the present invention relate to a projection display for displaying a color image by modulating a plurality of single beams according to image information and enlarging and projecting the modulated beams onto a screen and, more particularly, to a compact projection display capable of providing high throughput.

2. Description of the Related Art

A related art projection display includes an illumination unit for irradiating light, a scrolling unit for scrolling light irradiated from the illumination unit, and a light modulator for modulating light according to image information. A liquid crystal (LC) panel or digital micromirror device (DMD) panel may be used as the light modulator. Projection displays are classified into single-panel projection displays and three-panel projection displays according to the number of panels used.

A single-panel projection display includes a light source for emitting white light and color filters for time-sequentially separating white light into red, green, and blue light. The single-panel projection display provides low throughput. A three-panel projection display includes a light source for emitting white light, a plurality of dichroic mirrors for separating white light into red, green, and blue beams, a plurality of display panels, and a color combiner. However, the three-panel projection display has a large number of components and is therefore bulky.

A rotating spiral lens or rotating prism is used as a scrolling unit. However, such a rotating spiral lens is bulky and does not result in a compact size and such a rotating prism causes color break-up.

SUMMARY OF THE INVENTION

Exemplary embodiments of the present invention provide a compact projection display with high throughput.

According to an aspect of the present invention, there is provided a projection display including: an illumination unit which irradiates a plurality of single color light beams; a first scanner which scans the plurality of light beams irradiated from the illumination unit along a first direction; a light modulator with a linear array of micro- electromechanical system (MEMS) devices that are arranged parallel to the first direction so as to turn a light beam scanned by the first scanner ON or OFF for each pixel; an F-θ lens disposed between the first scanner and the light modulator and having a first entrance pupil on which a light beam scanned by the first scanner is incident and a second entrance pupil on which light beams modulated by the light modulator are incident; and a second scanner disposed opposite to the second entrance pupil of the F-θ lens and which scans a light beam passing through the second entrance pupil of the F-θ lens on a screen along a second direction that is orthogonal to the first direction.

The illumination unit includes: a plurality of laser light sources; a plurality of collimators which collimate light beams emitted by the plurality of laser light sources; and an X-cube prism which changes the optical path of the collimated light beams so that the light beams are directed towards the first scanner of the projection display.

The plurality of laser light sources are arranged such that adjacent single color light beams incident on the first scanner have an incidence angle difference of $\Delta\theta$. The incidence angle difference $\Delta\theta$ is determined according to a pixel pitch.

The light modulator is disposed on a focal plane of the F-θ lens.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

Projection displays according to exemplary embodiments of the present invention will now be described more fully with reference to the accompanying drawings. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. In the drawings, like reference numerals denote like elements, and thus their description will be omitted. The dimension of each component may be exaggerated for the sake of clarity and convenience.

Figure 1:
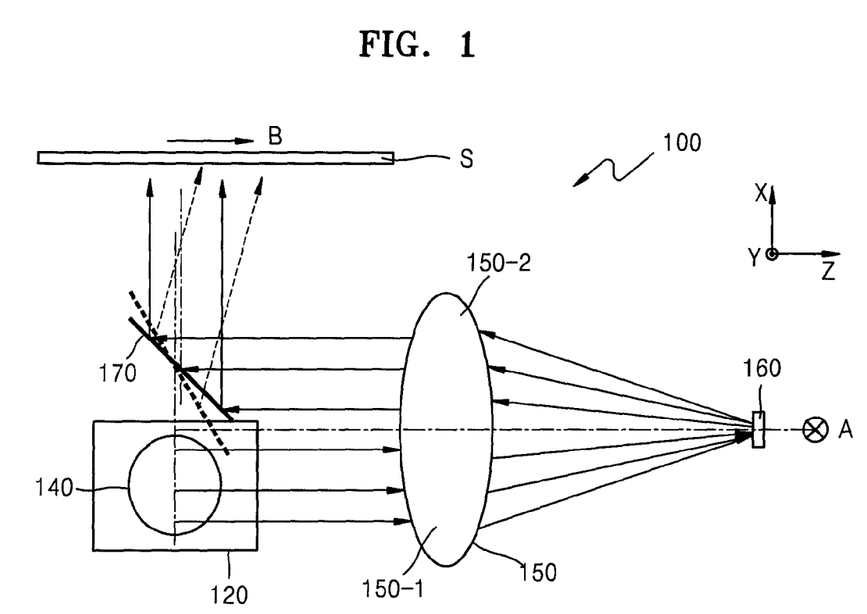
FIG. 1 is a schematic diagram illustrating a projection display according to an exemplary embodiment of the present invention.
Figure 2A:
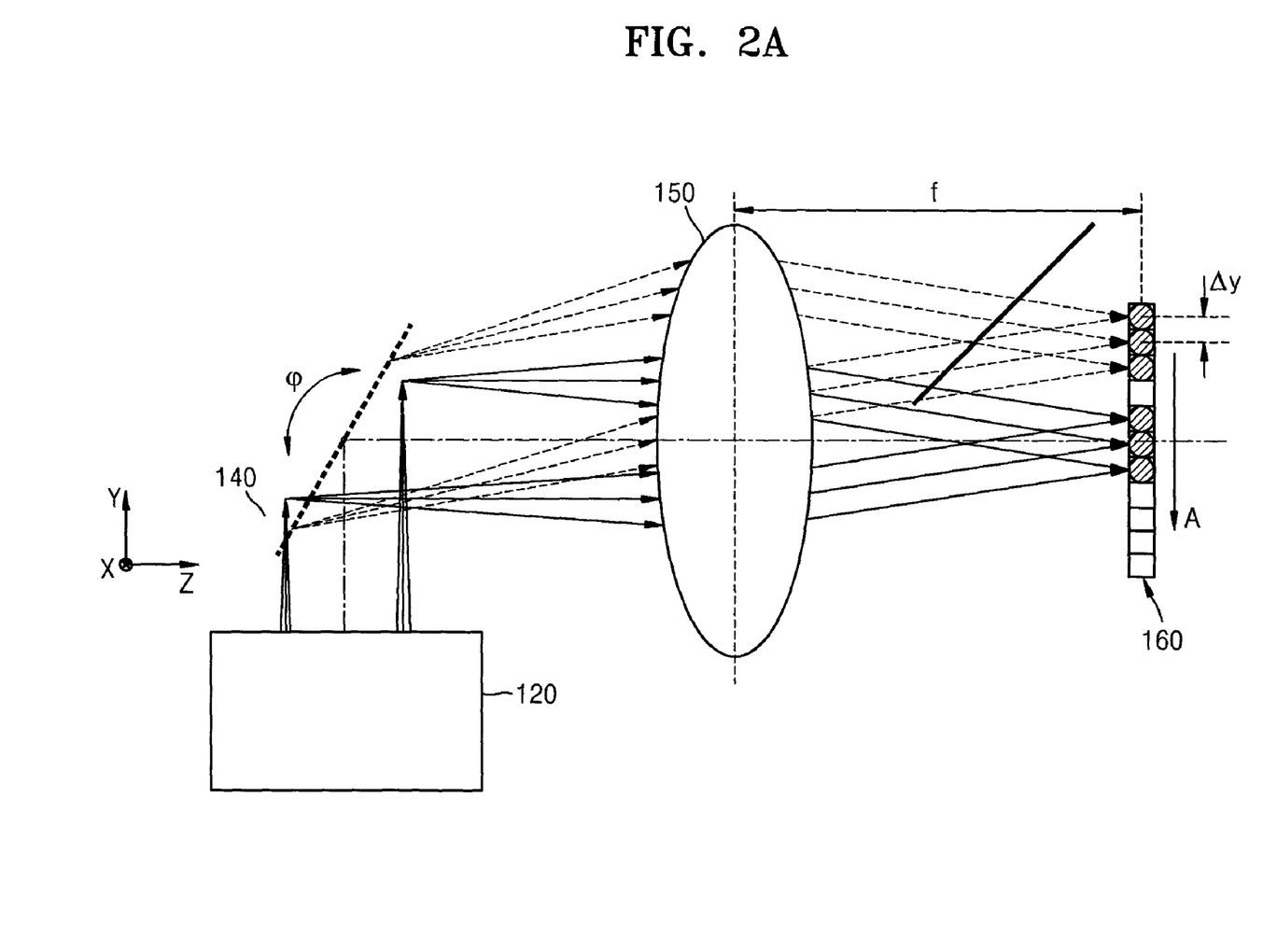
FIG. 2A is a diagram illustrating the projection display of FIG. 1 viewed from another plane and FIG. 2B is an enlarged view of a portion of the projection display of FIG. 2A, according to an exemplary embodiment of the present invention.
Figure 2B:
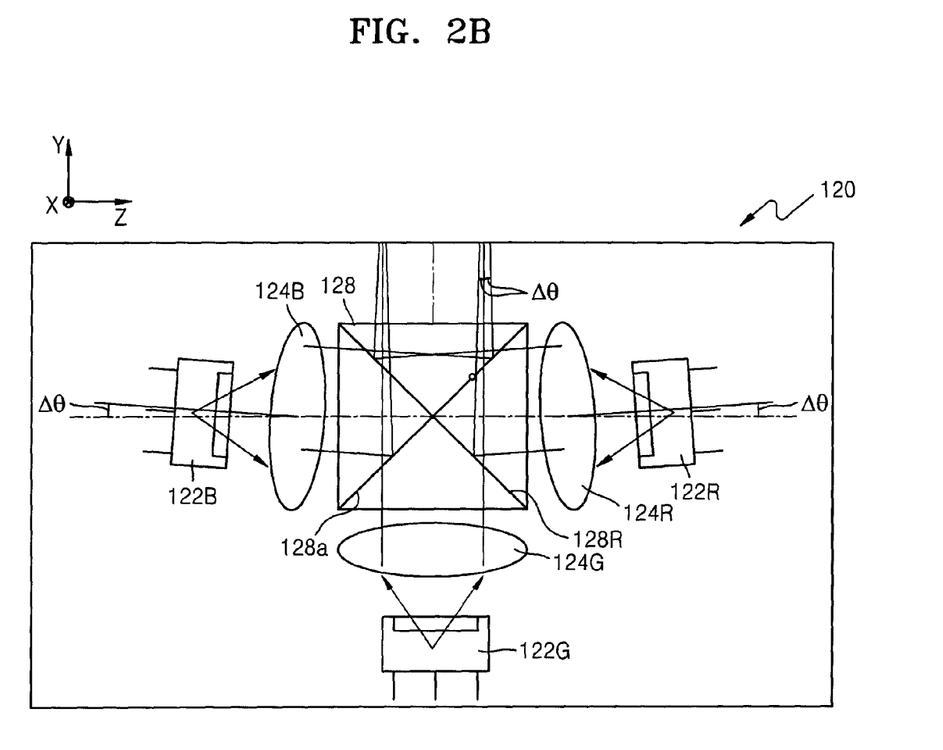
Figure 3:
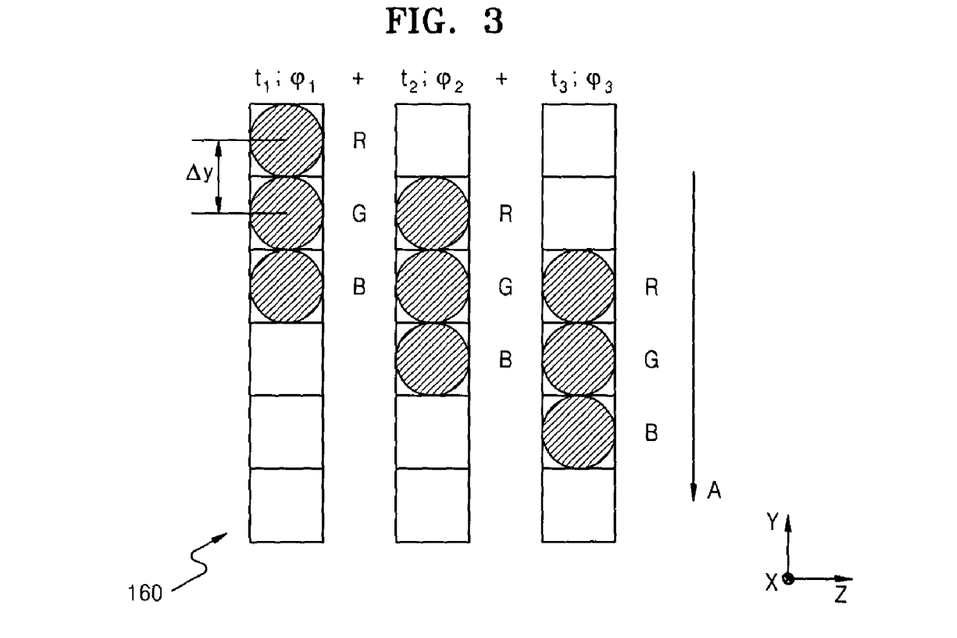
FIG. 3 is a diagram for explaining the principle in which beams that are scrolled pixel by pixel are modulated by a light modulator of the projection display in FIG. 1 to generate an image, according to an exemplary embodiment of the present invention.

FIG. 1 is a schematic diagram illustrating a projection display 100 according to an exemplary embodiment of the present invention. FIG. 2A is a diagram of the projection display 100 of FIG. 1 viewed from another plane and FIG. 2B is an enlarged view of an illumination unit 120 of the projection display 100 illustrated in FIG. 2A, according to exemplary embodiments of the present invention. FIG. 3 is a diagram for explaining the principle in which beams that are scrolled pixel by pixel_are modulated with a light modulator 160 of the projection display 100 in FIG. 1 to generate an image, according to an exemplary embodiment of the present invention.

Referring to FIGS. 1-3, the projection display 100 includes the illumination unit 120, a first scanner 140, an F-θ lens 150, the light modulator 160, and a second scanner 170.

The illumination unit 120 irradiates a plurality of single-color light beams. The illumination unit 120 includes first through third light sources 122R, 122G, and 122B emitting red (R), green (G), and blue (B) beams, respectively, collimators 124R, 124G, and 124B respectively facing the first through third light sources 122R, 122G, and 122B, and an X-cube prism 128 directing the collimated beams towards the first scanner 140. The plurality of first through third light sources 122R, 122G, and 122B may be laser light sources such as, for example, laser diodes, vertical cavity surface emitting lasers (VCSELs), or micro lasers. The X-cube prism 128 includes blue and red dichroic mirrors 128a and 128b transmitting or reflecting light according to the wavelength and changes of the path of incident color light. The locations of the first through third light sources 122R, 122G, 122B and blue, red dichroic mirrors 128a, 128b may be interchanged with each other. The first and third light sources 122R and 122B are inclined at a predetermined angle Δθ to the X-cube prism 128. The second light source 122G is disposed parallel to the X-cube prism 128. Thus, when R and B beams passing through the X-cube prism 128 are incident on the first scanner 140, the R and B beams respectively have an incidence angle difference of +Δθ and −Δθ with respect to the G beam. When the locations of the first and third light sources 122R and 122B, and blue and red dichroic mirrors 128a and 128b are interchanged with each other, the R and B beams respectively have the incidence angle difference of −Δθ and +Δθ with respect to the G beam. The incidence angle difference of +Δθ is determined suitably according to a pixel pitch as will be described later.

The first scanner 140 scans incident light beams in a first direction indicated by an arrow A, which is in a negative Y-direction. For example, the first scanner 140 may be a micro-electromechanical (MEM) scanner having a plurality of micromirrors. The first scanner 140 oscillates over a predetermined angular range with respect to its rotary X-axis so that the first scanner 140 scans incident light along the Y-axis.

The F-θ lens 150 compensates for non-linear effects of the first scanner 140 so that light is incident on the light modulator 160 at regular intervals and focuses light modulated by the light modulator 160 towards the second scanner 170. To achieve the above-mentioned functions of the F-θ lens 150, an entrance pupil of the F-θ lens 150 is divided into first and second entrance pupils 150-1 and 150-2 that respectively face the first and second scanners 140 and 170.

The light modulator 160 includes a linear array of micro-electromechanical system (MEMS) devices that are arranged in a direction that the first scanner 140 scans light so as to turn light on or off The MEMS device may be a digital micromirror device (DMD) that consists of an array of micromirrors or thin-film micromirror array-actuated (TMA). As another example, the MEMS device may be a grating electomechanical system (GEMS) having an array of grating elements or grating light valve (GLV).

The second scanner 170 is disposed opposite to the second entrance pupil 150-2 of the F-θ lens 150 and scans a light beam along a second direction to create an image on a screen S. The second direction, which is in a Z-direction, is indicated by an arrow B and is orthogonal to the first direction. For example, the second scanner 170 may be a MEM scanner. The second scanner 170 oscillates over a predetermined angular range with respect to its rotary Y-axis so that the second scanner 170 scans an incident light beam on the screen S along the Z-direction.

The operation of projecting an image onto the screen S in the projection display 100 will now be described. The R, G, and B beams emitted by the first through third light sources 122R, 122G, and 122B are collimated into parallel beams by the first through third collimators 124R, 124G, and 124B and are incident on the X-cube prism 128. The G beam is transmitted through the blue and red dichroic mirrors 128a and 128b without undergoing a change in the optical path of the G beam. Because the second light source 122G is disposed parallel to the X-cube prism 128 and the first and third light sources 122R and 122B are inclined at an angle Δθ to the X-cube prism 128, when the B and R beams undergo an optical path change by the blue and red dichroic mirrors 128a and 128b, the R and B beams have a predetermined optical path difference with respect to the G beam. That is, Thus, the R and B beams respectively have incidence angle differences of ±Δθ with respect to the G beam when the R and B beams are incident on the first scanner 140.

The first scanner 140 oscillates over a predetermined angular range with respect to its rotary X-axis so that the first scanner 140 scans an incident light beam along the Y-direction. Referring to FIG. 3, the first scanner 140 rotates from one position corresponding to an angle φ1 to another position corresponding to an angle φ3 as time elapses from t1 to t3. The R, G, and B beams reaching the light modulator 160 move by a distance Δy along the negative Y-direction as indicated by arrow A. The light modulator 160 turns incident light on or off in response to image information to produce bright or dark pixels that are then combined into an image. A pixel pitch is a distance Δy between each of the R, G, and B beams reaching the light modulator 160. The pixel pitch Δy is determined by a focal length f of the F-θ lens 150 and Δθ. For example, when the light modulator 160 is disposed in a focal plane of the F-θ lens 150, Δy=f·Δθ.

Light modulated by the light modulator 160 is incident on the second entrance pupil 150-2 of the F-θ lens 150 before being focused and the focused light is then incident on the second scanner 170. The second scanner 170 oscillates about its rotary Y-axis so that the second scanner 170 scans an incident light beam along the Z-direction, which is orthogonal to the direction the first scanner 140, to create an image on the screen S.

Figure 4:
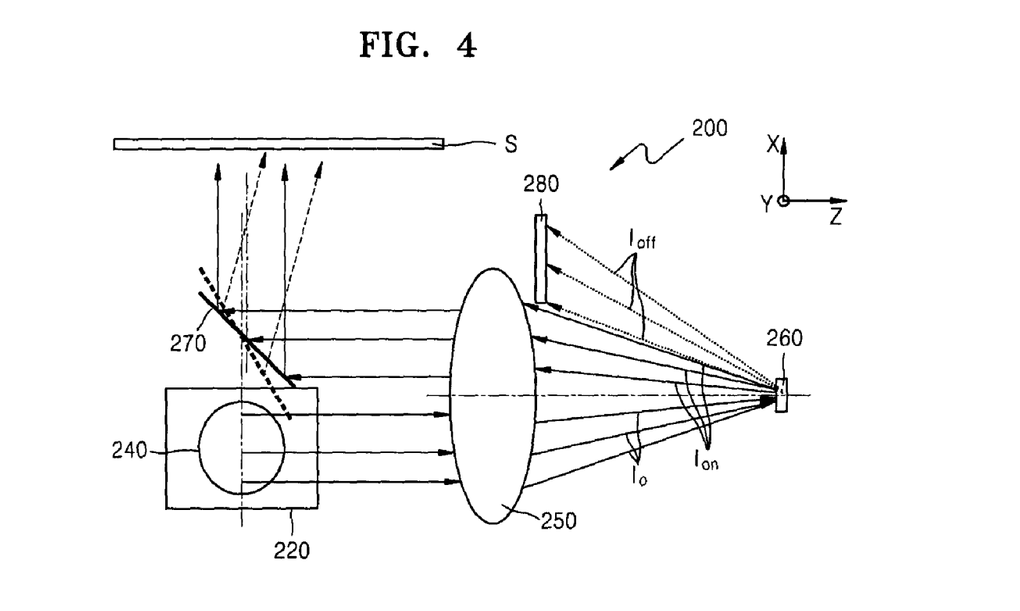
FIG. 4 illustrates a projection display with a light modulator having micromirrors, according to another exemplary embodiment of the present invention.
Figure 5:
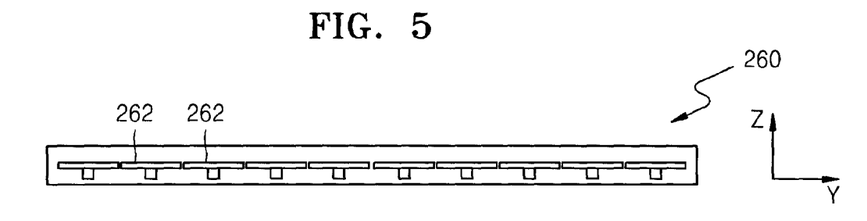
FIG. 5 illustrates a light modulator of the projection display illustrated in FIG. 4.
Figure 6A:
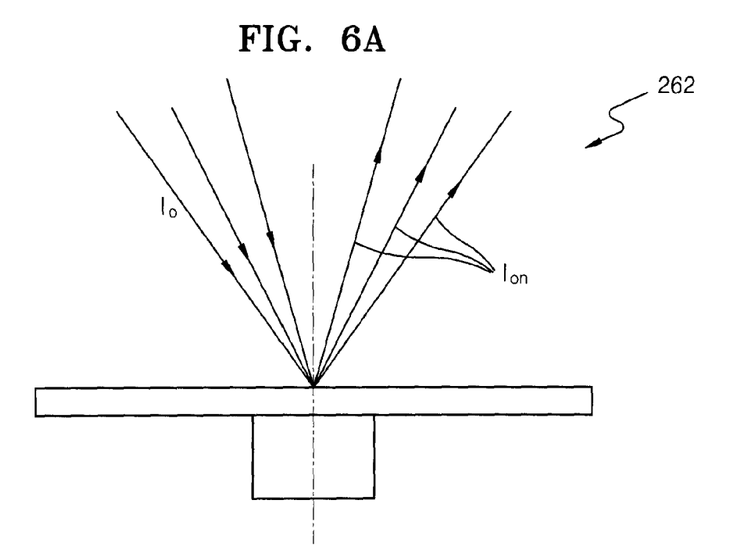
FIGS. 6A and 6B are diagrams for explaining the principle in which the micromirrors in the light modulator of the projection display illustrated in FIG. 5 turn light on or off.
Figure 6B:
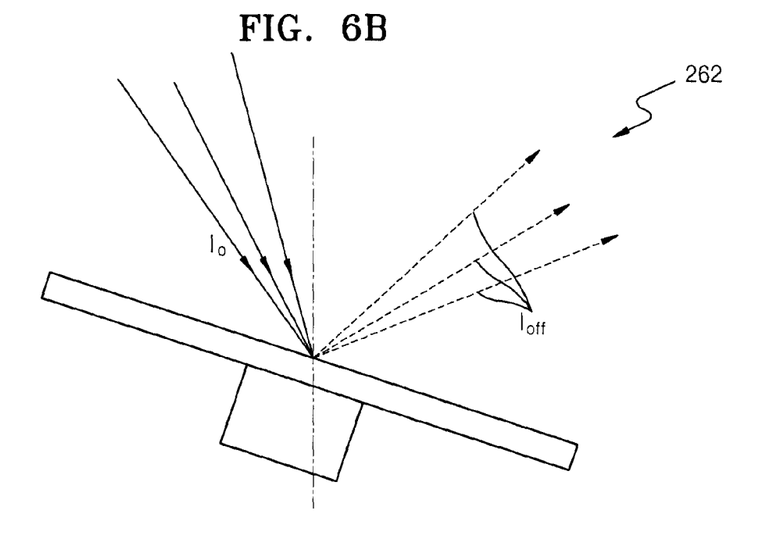

FIG. 4 illustrates a projection display 200 according to another exemplary embodiment of the present invention and FIG. 5 illustrates a light modulator 260 in the projection display 200 of FIG. 4. FIGS. 6A and 6B are diagrams for explaining the principle in which the light modulator 260 of the projection display 200 illustrated in FIG. 5 turns light on or off Referring to FIGS. 4-6B, the projection display 200 includes an illumination unit 220, a first scanner 240, an F-θ lens 250, the light modulator 260, a shadow mask 280, and a second scanner 270. Because the illumination unit 220, the first scanner 240, the F-θ lens 250, and the second scanner 270 have substantially the same structures and functions as those of the projection display 100 in FIG. 1, the description of the illumination unit 220, the first scanner 240, the F-θ lens 250, and the second scanner 270 is not provided. The light modulator 260 includes a linear array of micromirrors 262. Each of the micromirrors 262 may be tilted with respect to the arrangement direction of the linear array of micromirrors 262 by an electrostatic force. Referring to FIG. 6A, when the micromirror 262 is not tilted, incident light is reflected towards a screen S to turn on, and thus creating a beam $I_{on}$ in the "on" state, i.e., a bright pixel. Referring to FIG. 6B, when the micromirror 262 is tilted, incident light is reflected in a direction other than the screen S to turn off, and thus creating a beam $I_{off}$ in the "off" state, i.e. a dark pixel. The shadow mask 280 is disposed in front of the F-θ lens 250 to effectively prevent the beam $I_{off}$ in the "off" state from being reflected towards the screen S. The shadow mask 280 may be disposed at any location that can effectively block the beam $I_{off}$ in the "off" state. For example, the shadow mask 280 may be disposed to the rear of the F-θ lens 250.

Figure 7:
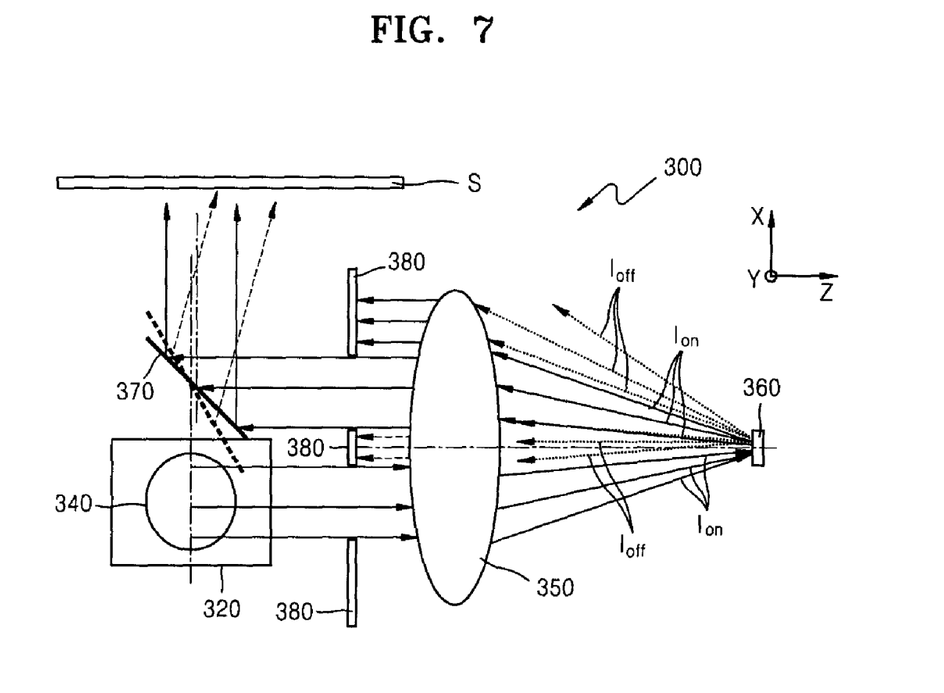
FIG. 7 illustrates a projection display with a light modulator having grating elements according to another exemplary embodiment of the present invention.
Figure 8A:
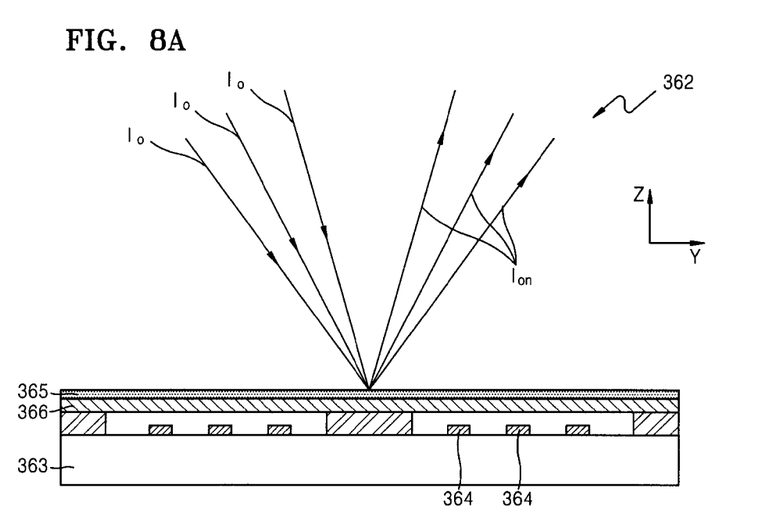
FIGS. 8A and 8B are diagrams for explaining the principle in which a grating electomechanical system (GEMS) in a light modulator illustrated in FIG. 7 turns light on or off.
Figure 8B:
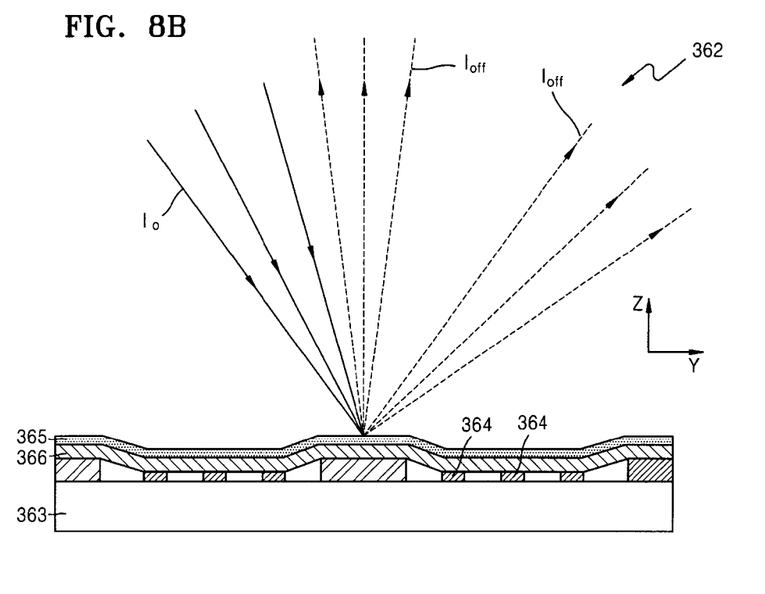

FIG. 7 illustrates a projection display 300 according to another exemplary embodiment of the present invention. FIGS. 8A and 8B are diagrams for explaining the principle in which a light modulator 360 in the projection display 300 of FIG. 7 turns light on or off Referring to FIGS. 7-8B, the projection display 300 includes an illumination unit 320, a first scanner 340, an F-θ lens 350, the light modulator 360, a shadow mask 380, and a second scanner 370. Because the illumination unit 320, the first scanner 340, the F-θ lens 350, and the second scanner 370 have substantially the same structures and functions as those of the projection display 100 in FIG. 1, the description of the illumination unit 320, the first scanner 340, the F-θ lens 350, and the second scanner 370 is not provided. The light modulator 360 includes an array of grating elements 362 repeatedly arranged along the Y direction. Each of the grating elements 362 includes a substrate 363, electrodes 364, a ribbon layer 366, and a metal layer 365 formed on the ribbon layer 366 as illustrated in FIG. 8A. When an electrostatic force is not applied due to the absence of a voltage between the metal layer 365 and the electrodes 364 of the grating elements 362, the ribbon layer 366 of the grating elements 362 maintains a predetermined height from the substrate 363 and acts like a flat mirror. That is, the incident light is reflected from the ribbon layer 266 to form a zero-order diffracted beam and is modulated into a beam Ion in the "on" state that is directed towards the screen S. Referring to FIG. 8B, when a voltage is applied between the metal layer 365 and the electrodes 364 of the grating elements 362, the ribbon layer 366 of the grating elements 362 is deflected towards the electrodes 364 by an electrostatic force to create a grating. That is, the incident light is diffracted into a plus and minus first-order, a plus and minus second-order, etc. In the plus and minus first-order, higher-order diffracted beams are prevented from being directed towards the screen S and modulated into beams in the "off" state, and thus creating dark pixels. The shadow mask 380 is disposed to the rear of the F-θ lens 350 to effectively block the beams $I_{off}$ in the "off" state. The shadow mask 380 may be disposed at any location that can effectively block a beam $I_{off}$ in the "off" state. For example, the shadow mask 380 may be disposed in front of the F-θ lens 350.

Figure 9:
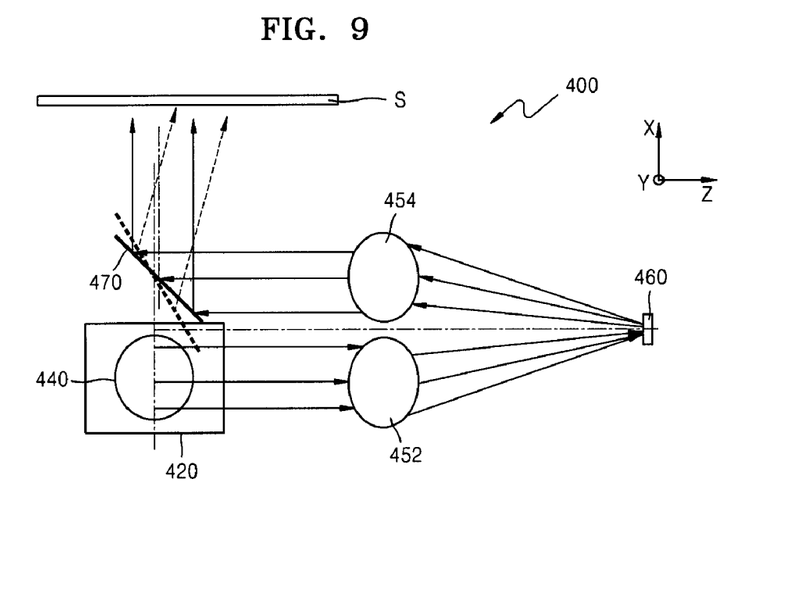
FIG. 9 illustrates a projection display according to another exemplary embodiment of the present invention.

FIG. 9 illustrates a projection display 400 according to another exemplary embodiment of the present invention. Referring to FIG. 9, the projection display 400 includes an illumination unit 420, a first F-θ lens 452, a light modulator 460, a second F-θ lens 454, and a second scanner 470. Because the illumination unit 420, the first scanner 440, the light modulator 460, and the second scanner 470 have substantially the same structures and functions as those of the projection display 100 in FIG. 1, the description of the illumination unit 420, the first scanner 440, the light modulator 460, and the second scanner 470 is not provided. The first F-θ lens 452 compensates for non-linear effects of the incident light beams scanned by the first scanner 440 to have linear intervals. The second F-θ lens 454 focuses a beam in the "on" state obtained by the light modulator 460 towards the second scanner 470. As described above, to achieve the required functions of the projection display 400, the projection display 400 uses both F-θ lenses 452 and 454 as opposed to the projection display 100 having the single F-θ lens 150.

Figure 10:
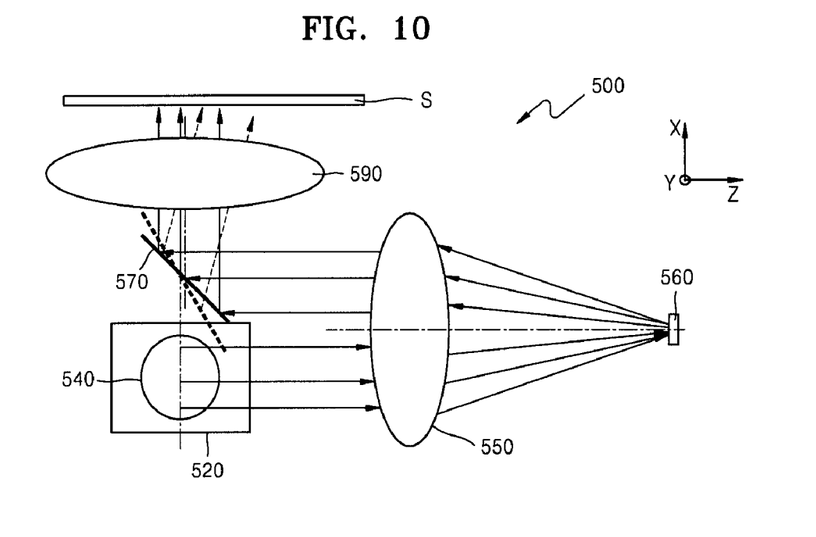
FIG. 10 illustrates a projection display according to another exemplary embodiment of the present invention.

FIG. 10 illustrates a projection display 500 according to another exemplary embodiment of the present invention. The projection display 500 is different from the projection display 100 in FIG. 1 in that the projection display 500 further includes a correction lens 590 disposed between a second scanner 570 and a screen S. The correction lens 590 compensates for distortion that may be present in an image created on the screen S due to non-linear effects caused when light is scanned by the second scanner 570. The correction lens 590 may be an F-θ lens.

A projection display consistent with the present invention has several advantages. One advantage of the projection display is that the projection display can provide higher throughput than a conventional single-panel projection display with a smaller number of optical components than a three-panel projection display. Another advantage is that the projection display undergoes little or no vibrations and achieves a more compact design due to the absence of bulky components such as a rotary prism.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection display comprising:
an illumination unit which irradiates a plurality of single color light beams;
a first scanner which scans the plurality of light beams irradiated from the illumination unit along a first direction;
a light modulator with a linear array of micro-electromechanical system (MEMS) devices that are arranged parallel to the first direction so as to turn a light beam scanned by the first scanner ON or OFF for each pixel;
an F-θ lens disposed between the first scanner and the light modulator and having a first entrance pupil on which a light beam scanned by the first scanner is incident and a second entrance pupil on which light beams modulated by the light modulator are incident; and
a second scanner disposed opposite to the second entrance pupil of the F-θ lens and scanning a light beam passing through the second entrance pupil of the F-θ lens on a screen along a second direction that is orthogonal to the first direction.

2. The display of claim 1, wherein the illumination unit comprises:
a plurality of laser light sources;
a plurality of collimators which collimate light beams emitted by the plurality of laser light sources; and an X-cube prism which changes the optical path of the collimated light beams so that the light beams are directed towards the first scanner of the projection display.

3. The display of claim 2, wherein the plurality of laser light sources are arranged such that adjacent single color light beams incident on the first scanner of the projection display have an incidence angle difference of $\Delta\theta$.

4. The display of claim 3, wherein the incidence angle difference $\Delta\theta$ is determined according to a pixel pitch.

5. The display of claim 2, wherein the plurality of laser light sources are one of laser diodes, vertical cavity surface emitting lasers (VCSELs), and micro lasers.

6. The display of claim 1, wherein the first scanner is a micro-electromechanical (MEM) scanner having a plurality of micromirrors.

7. The display of claim 1, wherein the light modulator is disposed on a focal plane of the F-$\theta$ lens.

8. The display of claim 1, wherein the MEMS devices are micromirrors that are operative to be tilted with respect to the first direction.

9. The display of claim 8, wherein each of the micromirrors reflects a light beam towards the screen to create a pixel in the ON state when the micromirror is not tilted and reflects a light beam in a direction other than towards the screen to create a pixel in the OFF state when the micromirror is tilted.

10. The display of claim 9, further comprising a shadow mask which prevents light in the OFF state obtained from the light modulator from being incident on the second entrance pupil.

11. The display of claim 1, wherein the MEMS device is a grating deflected by an electrostatic force.

12. The display of claim 11, wherein when the electrostatic force is not applied, the grating acts as a flat mirror to reflect a light beam towards the screen to create pixels in the ON state and when the electrostatic force is applied to create a diffraction grating, the grating prevents plus and minus first-order an higher-order diffracted beams from being directed towards the screen to create pixels in the OFF state.

13. The display of claim 12, further comprising a shadow mask preventing light in the OFF state obtained from the light modulator from being incident on the second entrance pupil.

14. The display of claim 1, wherein the second scanner is an MEM scanner having a plurality of micromirrors.

15. The display of claim 1, further comprising a correction lens disposed between the second scanner and the screen and which corrects the path of a light beam scanned by the second scanner.

16. A projection display comprising:
an illumination unit which irradiates a plurality of single color light beams;
a first scanner which scans the plurality of single color light beams irradiated from the illumination unit along a first direction;
a first F-$\theta$ lens which compensates incident light beams scanned by the first scanner to have linear intervals;
a light modulator with a linear array of micro-electromechanical system (MEMS) devices that are arranged parallel to the first direction so as to turn a light beam scanned by the first scanner ON or OFF for each pixel;
a second F-$\theta$ lens which focuses a beam in the ON state obtained from the light modulator; and
a second scanner disposed opposite to the second F-$\theta$ lens and scanning a light beam passing through the second F-$\theta$ lens on a screen along a second direction that is orthogonal to the first direction.

\* \* \* \* \*